US012562178B2

(12) United States Patent
Yang et al.

(10) Patent No.: US 12,562,178 B2
(45) Date of Patent: Feb. 24, 2026

(54) SYSTEM AND METHOD FOR KEYWORD SPOTTING IN NOISY ENVIRONMENTS

(71) Applicant: Samsung Electronics Co., Ltd.,
Suwon-si (KR)

(72) Inventors: Chou-Chang Yang, San Jose, CA (US);
Yashas Malur Saidutta, Menlo Park,
CA (US); Rakshith Sharma Srinivasa,
Sunnyvale, CA (US); Ching-Hua Lee,
Mountain View, CA (US); Yilin Shen,
San Jose, CA (US); Hongxia Jin, San
Jose, CA (US)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 198 days.

(21) Appl. No.: 18/470,788

(22) Filed: Sep. 20, 2023

(65) Prior Publication Data

US 2024/0339123 A1     Oct. 10, 2024

Related U.S. Application Data

(60) Provisional application No. 63/457,519, filed on Apr.
6, 2023.

(51) Int. Cl.
*G10L 21/0232*     (2013.01)
*G10L 15/06*     (2013.01)
(Continued)

(52) U.S. Cl.
CPC ........ *G10L 21/0232* (2013.01); *G10L 15/063*
(2013.01); *G10L 15/08* (2013.01); *G10L 25/18*
(2013.01); *G10L 2015/088* (2013.01)

(58) Field of Classification Search
CPC ... G10L 21/0232; G10L 15/063; G10L 15/08;
G10L 25/18; G10L 2015/088; G10L
21/0208; G10L 15/20
See application file for complete search history.

(56) References Cited

U.S. PATENT DOCUMENTS 8,306,817 B2     11/2012  Yu et al.
11,501,795 B2     11/2022  Sereshki et al.
(Continued)

FOREIGN PATENT DOCUMENTS

CN          111883117 A      11/2020
CN          113282785 A      8/2021
(Continued)

OTHER PUBLICATIONS

Yang, et al., "Robust Keyword Spotting for Noisy Environments by
Leveraging Speech Enhancement and Speech Presence Probabil-
ity," Interspeech 2023, Spoken Term Detection and Voice Search,
Dublin, Ireland, Aug. 20-24, 2023, pp. 1638-1642.
(Continued)

*Primary Examiner* — Abul K Azad

(57)          ABSTRACT

A method includes receiving an audio input and generating
a noisy time-frequency representation based on the audio
input. The method also includes providing the noisy time-
frequency representation to a noise management model
trained to predict a denoising mask and a signal presence
probability (SPP) map indicating a likelihood of a presence
of speech. The method further includes determining an
enhanced spectrogram using the denoising mask and the
noisy time-frequency representation. The method also
includes providing the enhanced spectrogram and the SPP
map as inputs to a keyword classification model trained to
determine a likelihood of a keyword being present in the
audio input. In addition, the method includes, responsive to
determining that a keyword is in the audio input, transmit-
ting the audio input to a downstream application associated
with the keyword.

20 Claims, 9 Drawing Sheets

(51) Int. Cl.
    *G10L 15/08*     (2006.01)
    *G10L 25/18*     (2013.01)

(56)            References Cited

U.S. PATENT DOCUMENTS

| | | | |
|---|---|---|---|
| 11,546,707 | B2 | 1/2023 | Rohde et al. |
| 11,646,045 | B2 | 5/2023 | Giacobello |
| 2011/0046948 | A1* | 2/2011 | Pedersen ............ G10L 21/0208 |
| | | | 704/E15.001 |
| 2013/0064379 | A1* | 3/2013 | Pardo ........................ H04S 7/40 |
| | | | 381/56 |
| 2021/0055778 | A1 | 2/2021 | Myer et al. |
| 2021/0343272 | A1* | 11/2021 | Pan ......................... G10L 15/16 |
| 2022/0366927 | A1* | 11/2022 | Pishehvar ............ G06N 3/0464 |
| 2023/0169956 | A1 | 6/2023 | D'Amato et al. |
| 2023/0402050 | A1* | 12/2023 | Vilkamo ................. G10L 15/08 |

FOREIGN PATENT DOCUMENTS

| | | |
|---|---|---|
| CN | 115713946 A | 2/2023 |
| WO | 2017091751 A1 | 6/2017 |

OTHER PUBLICATIONS

International Search Report and Written Opinion of the International Searching Authority dated May 24, 2024, in connection with International Application No. PCT/KR2024/095304, 7 pages.

* cited by examiner

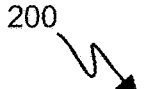
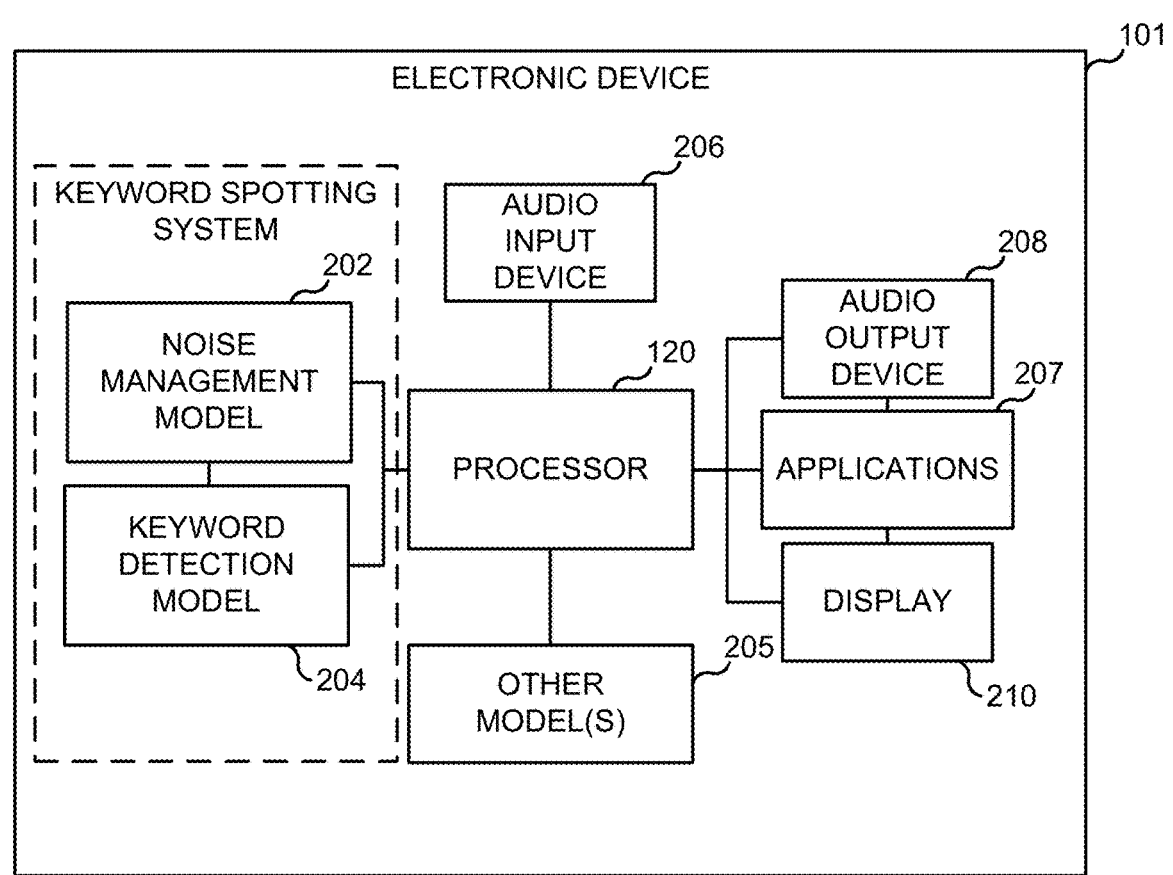
FIG. 2

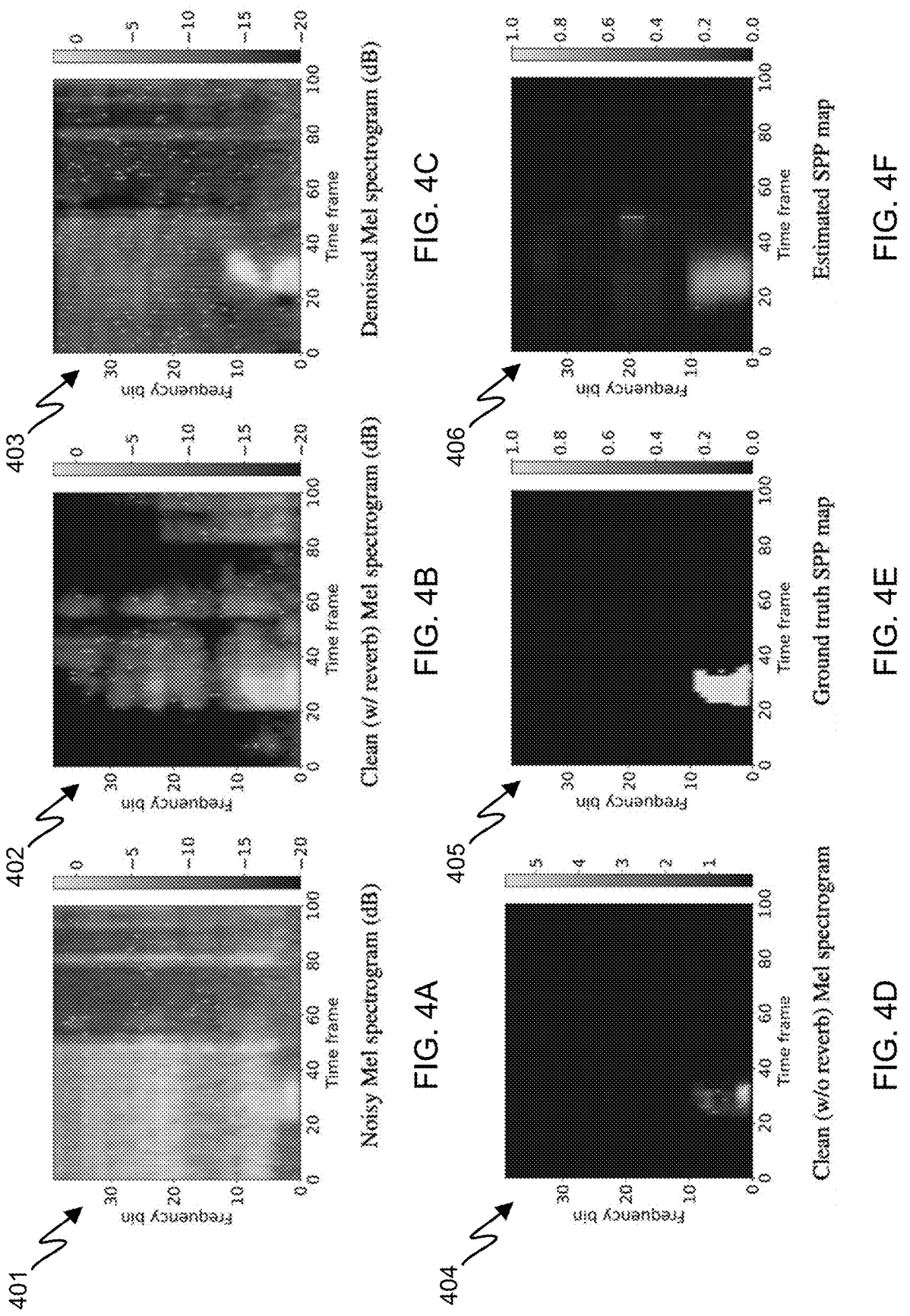
FIG. 4A — Noisy Mel spectrogram (dB) — 401
FIG. 4B — Clean (w/ reverb) Mel spectrogram (dB) — 402
FIG. 4C — Denoised Mel spectrogram (dB) — 403
FIG. 4D — Clean (w/o reverb) Mel spectrogram — 404
FIG. 4E — Ground truth SPP map — 405
FIG. 4F — Estimated SPP map — 406

600

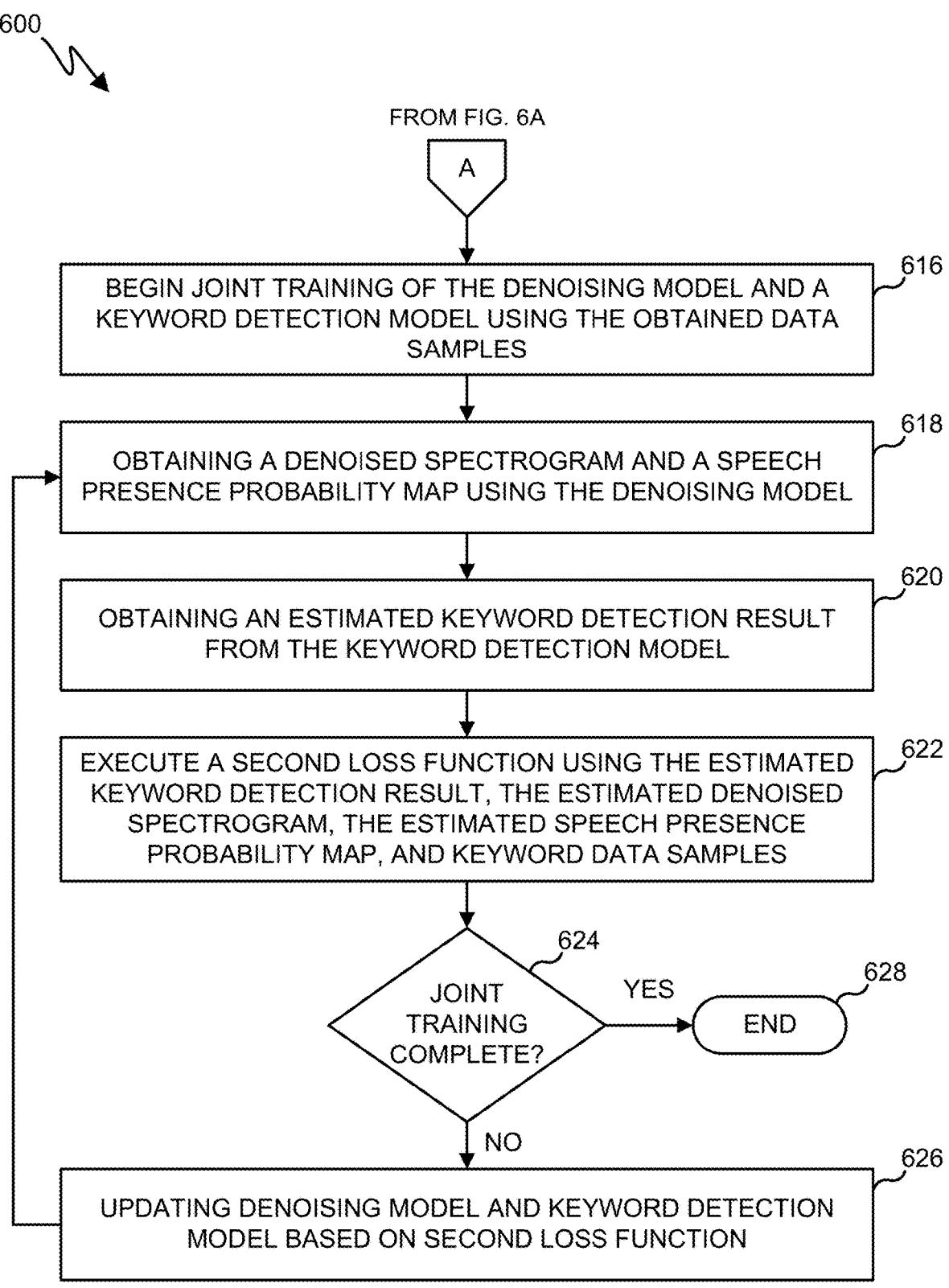

FROM FIG. 6A

A

BEGIN JOINT TRAINING OF THE DENOISING MODEL AND A KEYWORD DETECTION MODEL USING THE OBTAINED DATA SAMPLES — 616

OBTAINING A DENOISED SPECTROGRAM AND A SPEECH PRESENCE PROBABILITY MAP USING THE DENOISING MODEL — 618

OBTAINING AN ESTIMATED KEYWORD DETECTION RESULT FROM THE KEYWORD DETECTION MODEL — 620

EXECUTE A SECOND LOSS FUNCTION USING THE ESTIMATED KEYWORD DETECTION RESULT, THE ESTIMATED DENOISED SPECTROGRAM, THE ESTIMATED SPEECH PRESENCE PROBABILITY MAP, AND KEYWORD DATA SAMPLES — 622

JOINT TRAINING COMPLETE? — 624

YES → END — 628

NO

UPDATING DENOISING MODEL AND KEYWORD DETECTION MODEL BASED ON SECOND LOSS FUNCTION — 626

FIG. 6B

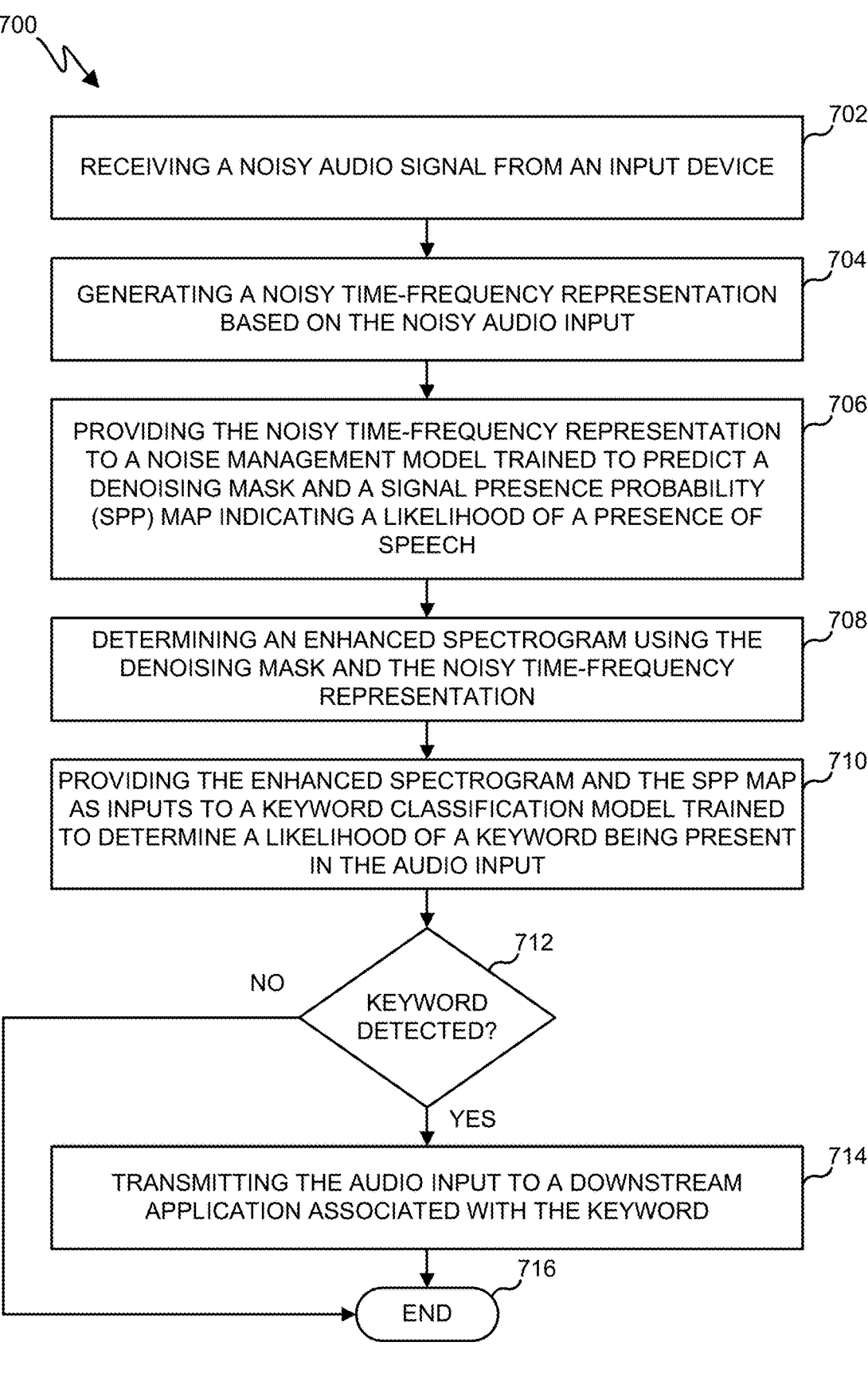

700

702
RECEIVING A NOISY AUDIO SIGNAL FROM AN INPUT DEVICE

704
GENERATING A NOISY TIME-FREQUENCY REPRESENTATION BASED ON THE NOISY AUDIO INPUT

706
PROVIDING THE NOISY TIME-FREQUENCY REPRESENTATION TO A NOISE MANAGEMENT MODEL TRAINED TO PREDICT A DENOISING MASK AND A SIGNAL PRESENCE PROBABILITY (SPP) MAP INDICATING A LIKELIHOOD OF A PRESENCE OF SPEECH

708
DETERMINING AN ENHANCED SPECTROGRAM USING THE DENOISING MASK AND THE NOISY TIME-FREQUENCY REPRESENTATION

710
PROVIDING THE ENHANCED SPECTROGRAM AND THE SPP MAP AS INPUTS TO A KEYWORD CLASSIFICATION MODEL TRAINED TO DETERMINE A LIKELIHOOD OF A KEYWORD BEING PRESENT IN THE AUDIO INPUT

712
KEYWORD DETECTED?

NO

YES

714
TRANSMITTING THE AUDIO INPUT TO A DOWNSTREAM APPLICATION ASSOCIATED WITH THE KEYWORD

716
END

FIG. 7

SYSTEM AND METHOD FOR KEYWORD SPOTTING IN NOISY ENVIRONMENTS

CROSS-REFERENCE TO RELATED APPLICATION AND PRIORITY CLAIM

This application claims priority under 35 U.S.C. § 119(e) to U.S. Provisional Patent Application No. 63/457,519 filed on Apr. 6, 2023, which is hereby incorporated by reference in its entirety.

TECHNICAL FIELD

This disclosure relates generally to machine learning systems. More specifically, this disclosure relates to a system and method for keyword spotting in noisy environments.

BACKGROUND

Driven by various mobile devices and smart home applications, keyword spotting (KWS) systems have gained considerable attention and have become an important aspect of human-device interaction. KWS systems continuously process audio streams to detect keywords. However, in many scenarios, devices running KWS systems are constrained in their memory and power budget. As a result, it is often useful or important to design KWS systems with an emphasis on a small memory footprint and low power consumption. Unfortunately, background noise during audio capture can significantly impact KWS accuracy, and techniques to deal with noisy environments can lead to increased memory and power usage. Thus, KWS systems may need to be able to effectively process audio inputs in noisy environments while also minimizing device memory and power usage.

SUMMARY

This disclosure relates to a system and method for keyword spotting in noisy environments.

In a first embodiment, a method includes receiving an audio input and generating a noisy time-frequency representation based on the audio input. The method also includes providing the noisy time-frequency representation to a noise management model trained to predict a denoising mask and a signal presence probability (SPP) map indicating a likelihood of a presence of speech. The method further includes determining an enhanced spectrogram using the denoising mask and the noisy time-frequency representation. The method also includes providing the enhanced spectrogram and the SPP map as inputs to a keyword classification model trained to determine a likelihood of a keyword being present in the audio input. In addition, the method includes, responsive to determining that a keyword is in the audio input, transmitting the audio input to a downstream application associated with the keyword.

In a second embodiment, an electronic device includes at least one processing device configured to receive an audio input and generate a noisy time-frequency representation based on the audio input. The at least one processing device is also configured to provide the noisy time-frequency representation to a noise management model trained to predict a denoising mask and an SPP map indicating a likelihood of a presence of speech. The at least one processing device is further configured to determine an enhanced spectrogram using the denoising mask and the noisy time-frequency representation. The at least one processing device is also configured to provide the enhanced spectrogram and the SPP map as inputs to a keyword classification model trained to determine a likelihood of a keyword being present in the audio input. In addition, the at least one processing device is configured, responsive to a determination that a keyword is in the audio input, to transmit the audio input to a downstream application associated with the keyword.

In a third embodiment, a non-transitory machine-readable medium contains instructions that when executed cause at least one processor of an electronic device to receive an audio input and generate a noisy time-frequency representation based on the audio input. The non-transitory machine-readable medium also contains instructions that when executed cause the at least one processor to provide the noisy time-frequency representation to a noise management model trained to predict a denoising mask and an SPP map indicating a likelihood of a presence of speech. The non-transitory machine-readable medium further contains instructions that when executed cause the at least one processor to determine an enhanced spectrogram using the denoising mask and the noisy time-frequency representation. The non-transitory machine-readable medium also contains instructions that when executed cause the at least one processor to provide the enhanced spectrogram and the SPP map as inputs to a keyword classification model trained to determine a likelihood of a keyword being present in the audio input. In addition, the non-transitory machine-readable medium contains instructions that when executed cause the at least one processor, responsive to a determination that a keyword is in the audio input, to transmit the audio input to a downstream application associated with the keyword.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 2 illustrates an example audio denoising and keyword detection system in accordance with this disclosure;

FIGS. 4A through 4F illustrate example representations of spectrograms and signal presence probability (SPP) maps in accordance with this disclosure;

FIGS. 6A and 6B illustrate an example method for training a keyword spotting system in accordance with this disclosure; and FIG. 7 illustrates an example keyword spotting method in accordance with this disclosure.

DETAILED DESCRIPTION

Figure 1:
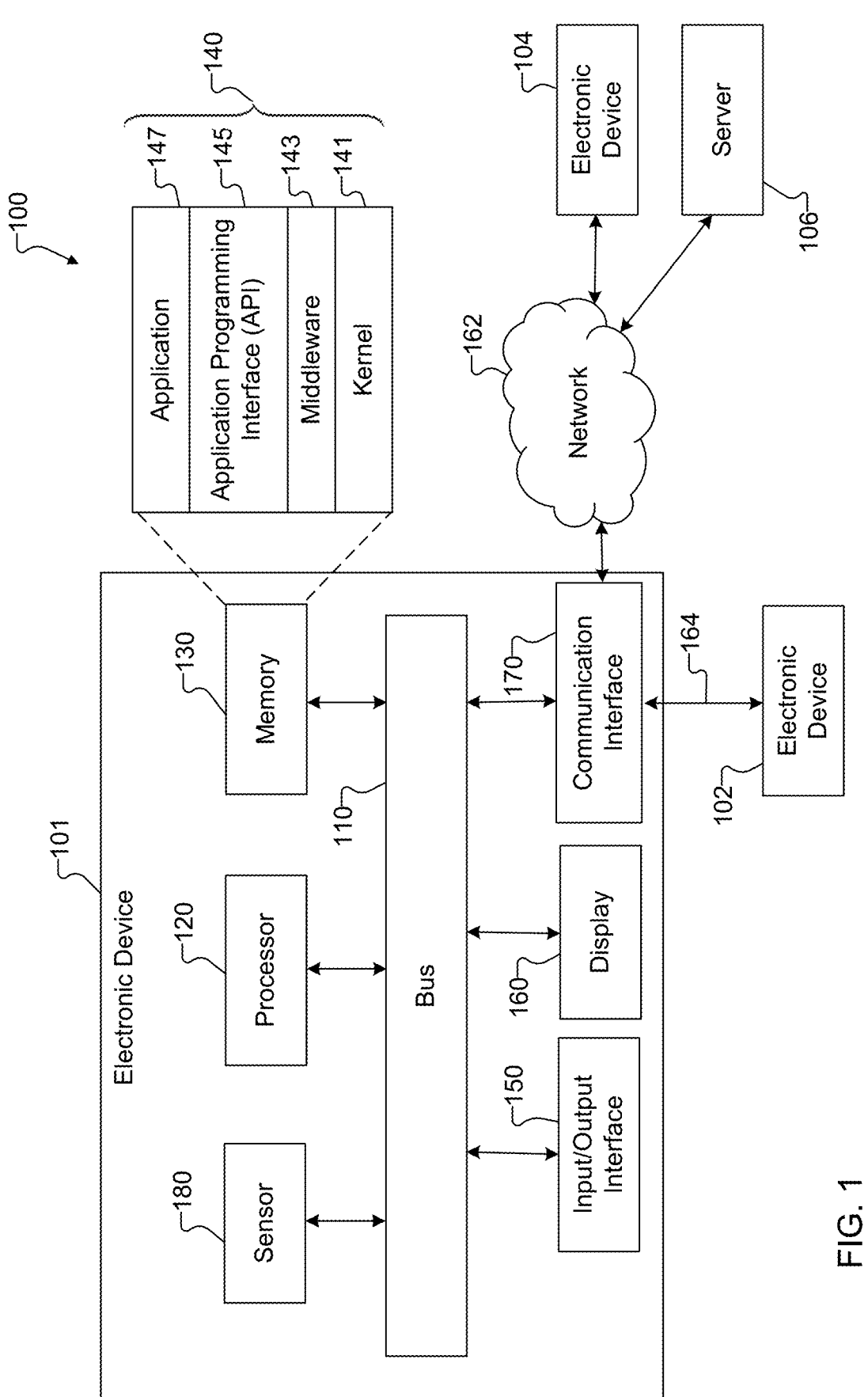
FIG. 1 illustrates an example network configuration including an electronic device in accordance with this disclosure.

FIGS. 1 through 7, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, driven by various mobile devices and smart home applications, keyword spotting (KWS) systems have gained considerable attention and have become an important aspect of human-device interaction. KWS systems continuously process audio streams to detect keywords. However, in many scenarios, devices running KWS systems are constrained in their memory and power budget. As a result, it is often useful or important to design KWS systems with an emphasis on a small memory footprint and low power consumption. Unfortunately, background noise during audio capture can significantly impact KWS accuracy, and techniques to deal with noisy environments can lead to increased memory and power usage. Thus, KWS systems may need to be able to effectively process audio inputs in noisy environments while also minimizing device memory and power usage.

Existing KWS systems based on deep neural networks (DNNs) can perform well in relatively clean (non-noisy) conditions but often degrade significantly in noisy environments. Room acoustics and noise conditions can be highly diverse, leading to drastic performance degradation if not handled carefully. Without carefully accounting for noise, a less sensitive KWS system might fail to detect a keyword in low signal-to-noise ratio (SNR) environments, leading to low detection rates. On the other hand, a more sensitive system might mistake background noise for keywords and accidentally trigger the device, resulting in high false acceptance rates. It can be particularly challenging for small models to achieve robustness to noise.

Some attempts at handling noisy audio signals have tried to straightforwardly leverage speech enhancement front ends that, while providing some robustness to noise, often trade off model conciseness for increased detection rate due to a lack of efficient noise management, especially in the presence of strong noise. For example, these denoising models may be designed to estimate an entire clean speech signal, resulting in reduced efficiency due to redundancy in phase estimation. This can lead to such models easily handling over one million parameters in some cases, which becomes unmanageable, especially on resource-constrained devices. Therefore, noise management using more than simply a denoising front end may be needed.

This disclosure provides systems and methods for keyword spotting in noisy environments that leverage both speech enhancement and speech presence probabilities. Embodiments of this disclosure provide for improved keyword spotting for both noisy near-field and far-field environments while maintaining a small memory footprint by jointly performing speech enhancement (SE) to denoise an audio signal and (at the same time) incorporating positional information of a keyword in a two dimensional (2D) time-frequency (T-F) domain. In various embodiments, SE and speech presence probability (SPP) estimation can simultaneously be performed using a noise management front-end, which may be referred to as "SE-SPP Net." The SE-SPP Net is trained to predict a denoising mask and an SPP map. The denoising mask may be used to generate an estimate of a clean (noise-free) input signal. The learned SPP map may include values ranging from zero to one in order to represent the likelihood of the presence of speech in the noisy mixture at the input. Thus, SPP can effectively encode positional information of the utterance in the T-F domain. The learned SPP map can be passed to a keyword detection model along with the estimated denoised signal. In this way, the described techniques can provide a robust small-footprint KWS system that can use an SE-SPP Net model for far-field and noisy environments, that can incorporate multi-step training of denoising and keyword detection models, and that can provide magnitude-only feature extraction for keyword detection without needing to learn phase information, which reduces or minimizes model computation.

Note that while some of the embodiments discussed below are described in the context of use in consumer electronic devices (such as smartphones), this is merely one example. It will be understood that the principles of this disclosure may be implemented in any number of other suitable contexts and may use any suitable device or devices. Also note that while some of the embodiments discussed below are described based on the assumption that one device (such as a server) performs training of a machine learning model that is deployed to one or more other devices (such as one or more consumer electronic devices), this is also merely one example. It will be understood that the principles of this disclosure may be implemented using any number of devices, including a single device that both trains and uses a machine learning model. In general, this disclosure is not limited to use with any specific type(s) of device(s).

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. For example, as described below, the processor 120 may receive and process inputs (such as audio inputs or data received from one or more audio input devices like one or more microphones) and perform both speech enhancement and speech presence probability tasks using one or more machine learning models and the inputs. The processor 120 may also instruct one or more downstream applications to perform one or more functions, such as outputting audio using one or more audio output devices like one or more speakers or display content on one or more displays 160. The processor 120 may further receive inputs (such as data samples to be used in training one or more machine learning models) and manage such training by inputting the samples to the machine learning model(s), receive outputs from the machine learning model(s), and execute one or more learning functions (such as one or more loss functions) to improve the machine learning model(s).

The memory 130 can include a volatile and/or nonvolatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to speech enhancement/denoising, keyword detection, and/or associated training. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more microphones or other audio sensors, which may be used to capture audio signals. The sensor(s) 180 can also include one or more buttons for touch input, one or more cameras or other imaging sensors, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform various operations related to speech enhancement/denoising, keyword detection, and/or associated training. For example, as described below, the server 106 may receive and process inputs (such as audio inputs or data received from one or more audio input devices like one or more microphones) and perform both speech enhancement and speech presence probability tasks using one or more machine learning models and the inputs. The server 106 may also instruct one or more downstream applications to perform one or more functions, such as outputting audio using one or more audio output devices like one or more speakers or display content on one or more displays 160. The server 106 may further receive inputs (such as data samples to be used in training one or more machine learning models) and manage such training by inputting the samples to the machine learning model(s), receive outputs from the machine learning model (s), and execute one or more learning functions (such as one or more loss functions) to improve the machine learning model(s).

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

FIG. 2 illustrates an example audio denoising and keyword detection system 200 in accordance with this disclosure. For ease of explanation, the system 200 is described as involving the use of the electronic device 101 in the network configuration 100 of FIG. 1. However, the system 200 may be used with any other suitable electronic device(s), such as the server 106, and in any other suitable system(s).

As shown in FIG. 2, the system 200 includes the electronic device 101, which includes the processor 120. The processor 120 is operatively coupled to or otherwise configured to use one or more machine learning models, such as a noise management model 202 and a keyword detection model 204. In various embodiments, the noise management model 202 and the keyword detection model 204 form at least part of a keyword spotting (KWS) system. The noise management model 202 can be trained to predict both a denoising mask used to enhance/denoise audio and a speech presence probability (SPP) map from noisy audio signals received via at least one audio input device 206 (such as one or more microphones or other audio sensors 180). The denoising mask can be used to generate an enhanced spectrogram from noisy audio signals, while the speech presence probability map can provide a likelihood that speech is present in the audio signals.

The outputs from the noise management model 202 can be provided to the keyword detection model 204 to obtain a probability that a keyword is present in the denoised audio signals. Based on the output of the keyword detection model 204, the processor 120 can determine whether one or more further device actions should be performed or not. For instance, the processor 120 may be operatively coupled to or otherwise configured to use one or more other models 205, such as one or more models related to voice assistants or other processes like one or more automated speech recognition (ASR) models and/or one or more natural language understanding (NLU) models. It will be understood that the machine learning models 202-205 can be stored in a memory of the electronic device 101 (such as the memory 130) and accessed by the processor 120 to perform speech enhancement/denoising, keyword spotting, and/or other tasks. However, the machine learning models 202-205 can be stored in any other suitable manner.

The processor 120 can also be operatively coupled to or otherwise configured to use one or more downstream applications 207. The downstream application(s) 207 can perform one or more device functions that can be triggered by keyword detection and can use device hardware (such as one or more cameras, displays, speakers, etc.) to perform the device function(s). For example, as shown in FIG. 2, the system 200 can include an audio output device 208 (such as a speaker or headphones) and a display 210 (such as a screen or a monitor like the display 160). When a keyword is detected by the keyword detection model 204 using the denoised audio signals and the speech presence probabilities provided by the noise management model 202, one or more other models or applications, such as a smart assistant, can be executed, and the processor 120 may instruct one or more further actions that correspond to one or more instructions or requests provided in an utterance included in the audio signals.

As an example of this, suppose an utterance is received from a user via the audio input device 206 (such as "hey BIXBY, call mom") as noisy audio signals. Here, the noise management model 202 denoises the audio signals and provides enhanced audio signals as well as a speech presence probability map that allow for improved keyword detection accuracy by the keyword detection model 204. The keyword detection model 204 can determine that one or more keywords (such as BIXBY) are detected, and further processing of the utterance can be performed (such as to determine an intent of the utterance using the other models 205). In some embodiments, the other models 205 can also benefit from the denoised audio signals provided by the noise management model 202, such that the other models 205 can use the denoised audio rather than the original noisy audio signals. Based on this utterance, the processor 120 can instruct the audio output device 208 to output "calling Mom," and the processor 120 can cause a phone application or other communication application to begin a communication session with a "mom" contact stored on the electronic device 101 or otherwise in association with the user of the electronic device 101. As another example, suppose an utterance of "hey BIXBY, start a timer" is received. Here, using the results provided by the noise management model 202 and the keyword detection model 204, the processor 120 may instruct execution of a timer application and display of a timer on the display 210 of the electronic device 101.

Although FIG. 2 illustrates one example of an audio denoising and keyword detection system 200, various changes may be made to FIG. 2. For example, the audio input device 206, the audio output device 208, and the display 210 can be connected to the processor 120 within the electronic device 101, such as via wired connections or circuitry. In other embodiments, the audio input device 206, the audio output device 208, and the display 210 can be external to the electronic device 101 and connected via wired or wireless connections. Further, in some embodiments, one or more models, including the noise management model 202, the keyword detection model 204, and the other models 205, can be stored remotely from the electronic device 101, such as on the server 106. Here, the electronic device 101 can transmit requests including inputs (such as captured audio data) to the server 106 for processing of the inputs using the noise management model 202 and the keyword detection model 204, and the results can be sent back to the electronic device 101. In other embodiments, the electronic device 101 can be the server 106, which receives audio inputs from a client device and transmits instructions back to the client device to execute functions associated with instructions included in utterances. In addition, in some cases, the noise management model 202 and the keyword detection model 204, as well as one or more of the other machine learning models 205, can be stored as separate models called upon by the processor 120 to perform certain tasks or can be included in and form a part of one or more larger machine learning models.

Figure 3:
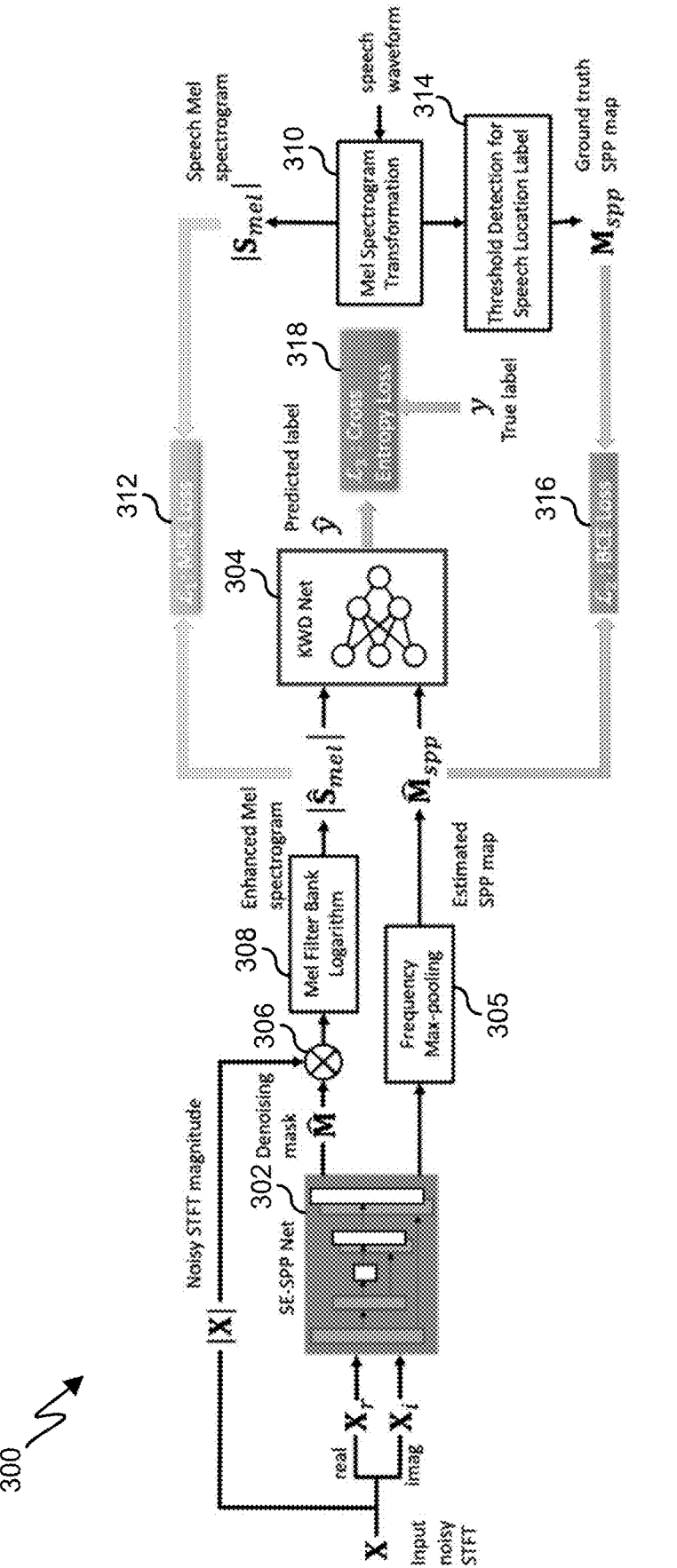
FIG. 3 illustrates an example audio denoising and keyword spotting architecture in accordance with this disclosure.

FIG. 3 illustrates an example audio denoising and keyword spotting architecture 300 in accordance with this disclosure. For ease of explanation, the architecture 300 shown in FIG. 3 is described as being implemented on or supported by the electronic device 101 in the network configuration 100 of FIG. 1, where the electronic device 101 can support the audio denoising and keyword detection system 200 of FIG. 2. However, the architecture 300 (or portions thereof) shown in FIG. 3 could be used with any other suitable device(s) and in any other suitable system(s), such as when at least part of the architecture 300 may be implemented on or supported by the server 106.

As shown in FIG. 3, the architecture 300 includes a denoising or noise management model 302 and a keyword classification or detection model 304. The noise management model 302 can be referred to as a speech enhancement (SE) and a speech presence probability (SPP) network (SE-SPP Net). As also shown in FIG. 3, the noise management model 302 is cascaded with the keyword detection model 304. This architecture 300 provides a robust KWS system that denoises audio signals and incorporates the SPP for extracting positional information to improve keyword detection, all while maintaining a small memory footprint. In some embodiments, various techniques described in this disclosure may be used in conjunction with the techniques described in Yang et al., "Robust Keyword Spotting for Noisy Environments by Leveraging Speech Enhancement and Speech Presence Probability," INTERSPEECH 2023, August 2023 (available at https://interspeech2023.org/program-at-a-glance/), which is hereby incorporated by reference in its entirety.

In some embodiments, the noise management model 302 receives, as inputs, time-frequency domain representations of noisy audio signals, such as at least one short-time Fourier transform (STFT) $X \in \mathbb{C}^{F \times T}$ of a noisy audio signal. In various embodiments, an additive noise model can be used. For instance, let f and t respectively represent a frequency index and a time frame index (with a total of F bins and T frames), where a microphone noisy signal STFT $X \in \mathbb{C}^{F \times T}$ can be expressed as follows.

$$X = H \odot S_0 + V = S + V \tag{1}$$

Here, $\forall f, t$, where $H \in \mathbb{C}^{F \times T}$ is an acoustic transfer function between a far-field target source $S_0 \in \mathbb{C}^{F \times T}$ and a microphone, and $S=H\odot S_0 \in \mathbb{C}^{F\times T}$ and $V\in\mathbb{C}^{F\times T}$ are speech and noise $\mathbb{C}$ components received by the microphone, respectively.

As shown in FIG. 3, in a first stage of the architecture 300, the time-frequency domain representation is divided into a real part $X_r$ and an imaginary part $X_i$. The noise management model 302 takes the real and imaginary spectrograms as inputs to jointly perform denoising and SPP estimation. The noise management model 302 provides two outputs, namely a mask to enhance the input noisy spectrogram and an estimated SPP map (denoted by $\hat{M}_{spp}$). In some cases, the denoising mask $\hat{M}$ is a matrix of size F×T with elements ranging between zero and one. At a combination operation 306, the denoising mask $\hat{M}$ is multiplied with a noisy STFT magnitude $|X|$, obtained from the noisy STFT signal, to generate an enhanced magnitude spectrogram. The enhanced magnitude spectrogram is transformed using a filter bank function 308 to a spectral domain in order to provide an enhanced magnitude spectrogram. For example, the function 308 can transform the spectrogram to an enhanced Mel magnitude spectrogram $|\hat{S}_{mel}|$ using a Mel filter bank.

In some embodiments, the architecture 300 can use magnitude-only feature extraction without having to learn phase information, which helps reduce or minimize the use of computational resources. Existing approaches to speech denoising often use a denoising front end module, but the denoising front end module is designed to estimate an entire clean speech signal (while the subsequent keyword detection module only takes the estimated clean spectrogram as input features). This results in reduced efficiency due to the redundancy for phase estimation, leading to the keyword detection model easily receiving over one million parameters in some cases. Additionally, learning phase information is typically only useful for multiple microphone alignment or recovering time-series speech data, complicating the data provided to the keyword detection model. Conversely, the architecture 300 only uses magnitude of the input noisy speech (rather than the whole complex spectrogram) or equivalently the waveform in time domain. In this way, the architecture 300 becomes more efficient due to saving the additional complexity required for recovering the phase components, which are not used in the subsequent keyword detection model 304 for final detection. The architecture 300 thus allows for the model to be more compact and use less model parameters for small footprint design purposes.

In various embodiments, the estimated SPP map $\hat{M}_{spp}$ may be computed directly in the Mel spectral domain with dimensions matching those of the enhanced Melspectrogram $|\hat{S}_{mel}|$. In some embodiments, estimating the SPP map $\hat{M}_{spp}$ can include performing a frequency max pooling function 305. The SPP map represents a likelihood of speech being present in each T-F bin in the Mel spectrogram domain. Subsequently, both the enhanced Mel spectrogram $|\hat{S}_{mel}|$ and the estimated SPP map $\hat{M}_{spp}$ are provided as inputs to a second stage of the architecture 300, which includes the keyword detection model 304. The keyword detection model 304, using the enhanced Mel spectrogram $|\hat{S}_{mel}|$ and the estimated SPP map $\hat{M}_{spp}$, performs a classification task to predict a class label $\hat{y}$ representing the class of keyword. It will be understood that the architecture 300 can incorporate any existing deep KWS models or other KWS models. As described in this disclosure, once a predicted keyword is determined, one or more further downstream applications, one or more machine learning models, and/or device hardware can be used to carry out one or more functions related to the audio inputs.

As also illustrated in FIG. 3, training of the noise management model 302 involves training the noise management model 302 to better estimate the enhanced Mel spectrogram $|\hat{S}_{mel}|$ using a ground truth speech Mel spectrogram $|\hat{S}_{mel}|$ obtained from a speech waveform data sample and using a Mel spectrogram transformation function 310. A loss 312 ($\mathcal{L}_1$) representing the differences between the estimated enhanced Mel spectrogram $|\hat{S}_{mel}|$ provided by the noise management model 302 and the ground truth speech Mel spectrogram $|\hat{S}_{mel}|$ is determined during training. In some cases, the loss 312 may represent a mean-squared-error (MSE) loss or other measure of loss.

Training of the noise management model 302 also involves training the noise management model 302 to better estimate the SPP map $\hat{M}_{spp}$ using a ground truth SPP map $M_{spp}$ obtained from a speech waveform data sample and using a function 314 for threshold detection for speech location labeling. A loss 316 ($\mathcal{L}_2$) representing the differences between the estimated SPP map $\hat{M}_{spp}$ provided by the noise management model 302 and the ground truth SPP map $M_{spp}$ is determined during training. In some cases, the loss 316 may represent a binary cross-entropy (BCE) loss or other measure of loss. To learn to estimate the SPP, the noise management model 302 is trained to predict a binary map that represents speech presence (one) and absence (zero) obtained from the ground truth clean speech. The SPP map thus inherently carries information regarding the position of the speech utterance on the 2D T-F spectrogram, which provides useful information for the keyword detection model 304 to better focus on capturing the keyword characteristics.

After the noise management model 302 is trained, the noise management model 302 and the keyword detection model 304 can be jointly trained to reduce or minimize the differences between the predicted class label $\hat{y}$ and a ground truth class label y. A loss 318 ($\mathcal{L}_3$) representing these differences is determined. In some cases, the loss 318 may represent a cross-entropy loss or other measure of loss, which can also take into account further calculated losses 312, 316.

Although FIG. 3 illustrates one example of an audio denoising and keyword spotting architecture 300, various changes may be made to FIG. 3. For example, various components and functions in FIG. 3 may be combined, further subdivided, replicated, or rearranged according to particular needs. Also, one or more additional components and functions may be included if needed or desired. As a particular example, in various embodiments, the noise management model 302 can be based on a U-NET architecture that leverages a series of encoders and decoders based on 2D convolutions with skip connections for enhanced feature extraction. As described in this disclosure, the U-NET is configured to enhance the input signal as well as compute the SPP map to aid the downstream keyword detection model. However, it will be understood that the noise management model 302 can use any of a variety of architectures, such as various deep neural network (DNN) architectures, convolutional neural network (CNN) architectures, recurrent neural network (RNN) architectures, RESNET architectures, transformer architectures, etc., to allow for fitting different device specifications. Additionally or alternatively, the keyword detection model 304 can be constructed using various architectures, such as DNN architectures, BC-RESNET architectures, ConvMixer architectures, keyword transformer (KWT) architectures, etc., to allow for fitting different device specifications. For instance, a BC-RESNET architecture can be adopted for the keyword detection model 304 based on broadcasted residual learning that utilizes the advantage of one dimensional (1D) temporal and 2D convolution while reducing or minimizing the computations performed by the keyword detection model 304.

FIGS. 4A through 4F illustrate example representations of spectrograms and SPP maps in accordance with this disclosure. Use of denoised Mel spectrograms and estimated SPP maps provided by a noise management model and input to a keyword detection model, such as is described above with respect to FIG. 3, provides several potential advantages. For instance, this may allow for the keyword detection model to utilize a relatively noiseless signal, rather than seeing the original noisy mixture. This may also allow the keyword detection model to utilize positional information of the speech utterance distributed in the T-F domain and to thereby learn to better detect keywords.

As an example of this, as shown in FIGS. 4A through 4F, the representations graphically show the signal as frequency bins over a time frame (in milliseconds). FIG. 4A illustrates a noisy signal representation 401 in the Mel spectrogram domain, showing how noise causes the signal to become erratic. FIG. 4B illustrates the corresponding clean signal representation 402 with room reverberation $S_{mel}$, which generally provides a simpler signal for easier processing. FIG. 4C illustrates the denoised signal $\hat{S}_{mel}$ representation 403 provided by the noise management model of this disclosure. As shown in FIG. 4C, the signal is cleaner and provides a signal closer to the ground truth signal of FIG. 4B but still includes some noisy artifacts. The representations of FIGS. 4A through 4C include Mel spectrograms and SPP maps of a particular noisy keyword at a −10 dB signal-to-noise ratio (SNR) for illustration.

FIG. 4D illustrates the corresponding clean far-field signal representation 404 without room reverberation (non dB). As shown in FIG. 4D, without reverberation, the clean spectrogram includes an area targeting actual speech in the signal. FIG. 4E illustrates a ground truth SPP map representation 405 that can be obtained by thresholding either of the signals shown in FIGS. 4B and 4D. Similar to the spectrogram shown in FIG. 4D, the ground truth SPP map shown in FIG. 4E isolates the part of the signal corresponding to speech. FIG. 4F illustrates an estimated SPP map $\hat{M}_{spp}$ representation 406 provided by the noise management model of this disclosure. As shown in FIG. 4F, the estimated SPP map also isolates the portion of the signal corresponding to speech data. Thus, in addition to providing the denoised Mel spectrogram shown in FIG. 4C to the keyword detection model, providing the estimated SPP map (such as is shown in FIG. 4F) allows for the keyword detection model to better isolate speech signals in the input audio signals, leading to increased keyword detection accuracy and less computational requirements.

Although FIGS. 4A through 4F illustrate representations of spectrograms and SPP maps, various changes may be made to FIGS. 4A through 4F. For example, the signals illustrated in FIGS. 4A through 4F may differ in appearance based on the specific audio signal received. Graphical representation of signals can come in a wide variety of formats, and it will be understood that these representations are merely used here for illustrative purposes.

Figure 5A:
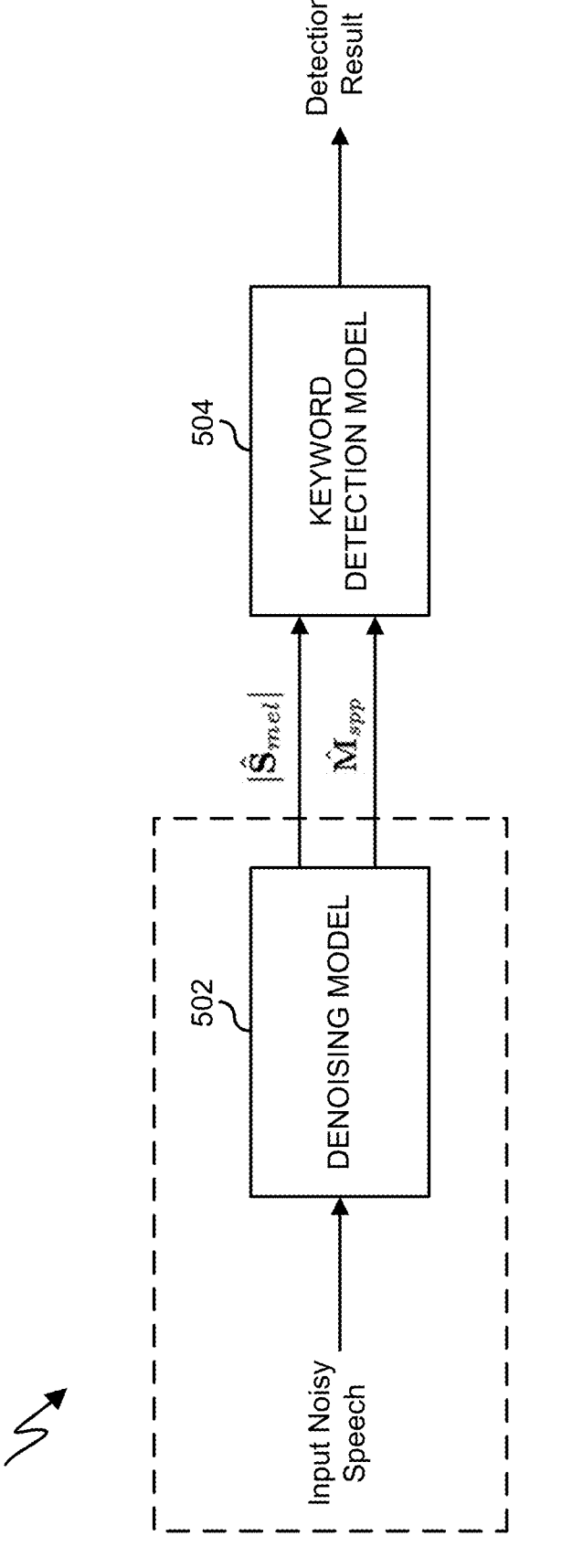
FIGS. 5A and 5B illustrate an example training process in accordance with this disclosure.
Figure 5B:
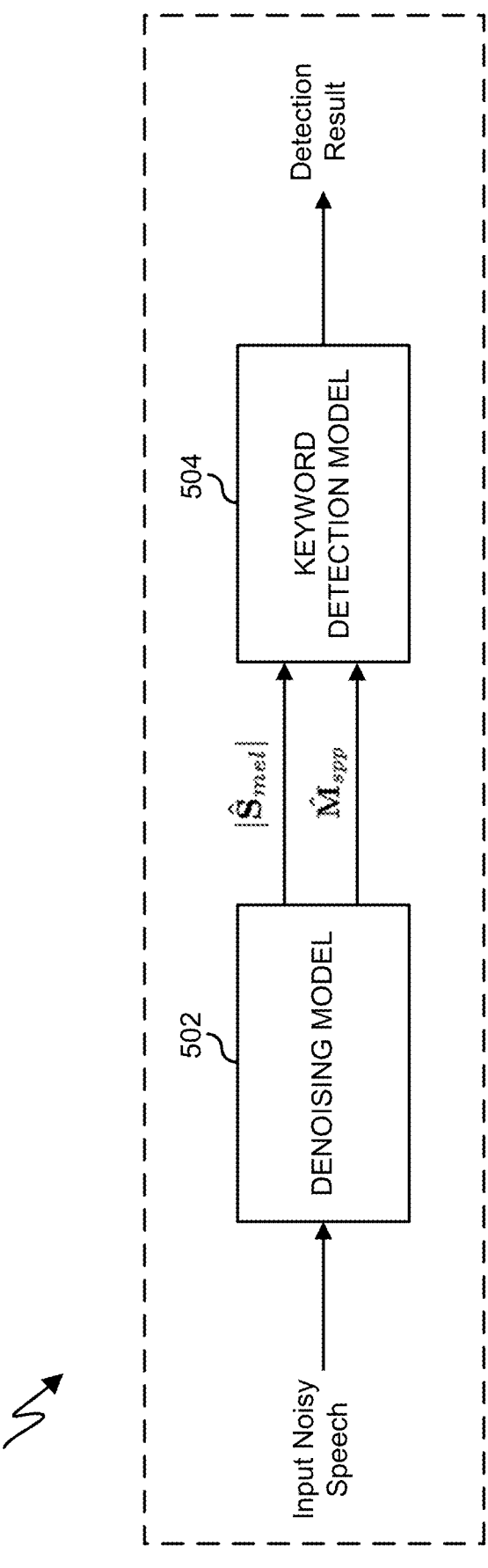

FIGS. 5A and 5B illustrate an example training process 500 in accordance with this disclosure. For ease of explanation, the process 500 is described as involving the use of the server 106 in the network configuration 100 of FIG. 1. However, the process 500 may be used with any other suitable electronic device (such as the electronic device 101)

or a combination of devices (such as the electronic device 101 and the server 106) and in any other suitable system(s).

FIG. 5A shows a first training step of the training process 500 in which a denoising model 502 (such as the noise management model 302) is trained to better perform denoising mask estimation $\hat{M}$ and SPP map $\hat{M}_{spp}$ estimation. During training of the denoising model, any noisy speech dataset can be used, and data samples in the training dataset can also include noisy audio without speech (non-speech noisy audio). As shown in FIG. 5A, the denoising model 502 is used to obtain an enhanced Mel magnitude spectrogram $|\hat{S}_{mel}|$ and an estimated SPP map $\hat{M}_{spp}$. The denoising model 502 is trained using a loss function that incorporates both a loss $\mathcal{L}_1$ (such as loss 312) and a loss $\mathcal{L}_2$ (such as loss 316). In some cases, the first loss function used during the first training step shown in FIG. 5A can be expressed as follows.

$$\mathcal{L}_{pre} = \lambda\mathcal{L}_1\big(|\hat{S}_{mel}|, |S_{mel}|\big) + \mathcal{L}_2\big(\hat{M}_{spp}, M_{spp}\big) \qquad (2)$$

Here, $\mathcal{L}_1(\cdot,\cdot)$ and $\mathcal{L}_2(\cdot,\cdot)$ are criteria for measuring the distance between two arguments, and $\lambda > 0$ is a hyperparameter for weighting the Mel spectrogram regression loss.

The loss function thus reduces or minimizes the distance between the estimated enhanced Mel magnitude spectrogram $|\hat{S}_{mel}|$ and a ground truth enhanced Mel magnitude spectrogram $|\hat{S}_{mel}|$ and reduces or minimizes the distance between the estimated SPP map $\hat{M}_{spp}$ and a ground truth SPP map $M_{spp}$. In various embodiments, MSE loss is used for $\mathcal{L}_1$ and BCE loss is used for $\mathcal{L}_2$. In this way, the denoising model 502 is trained on a set of noisy-clean pairs of speech signals. For instance, the target $M_{spp}$ can be obtained from the clean signal without reverberation, while $S_{mel}$ can be derived from the clean speech signal with reverberation.

Training of the denoising model 502 during the first training step can involve updating parameters of the denoising model 502 until an acceptable accuracy level is reached. For example, when the loss calculated by the loss function is larger than desired, the parameters of the denoising model 502 can be adjusted. Once adjusted, training can continue by providing the same or additional training data to the adjusted denoising model 502, and additional outputs from the denoising model 502 can be compared to the ground truths so that additional losses can be determined using the loss function. Eventually, the denoising model 502 produces more accurate outputs that more closely match the ground truths, and the measured loss becomes less. At some point, the measured loss can drop below a specified threshold, and the initial training of the denoising model 502 can be completed.

FIG. 5B illustrates a second training step of the process 500. During this second training step, the denoising model 502 and a keyword detection model 504 are jointly trained to provide improved keyword detection accuracy. In various embodiments, this training includes using keyword speech data samples. To jointly train the models 502, 504, a loss is determined, such as a cross-entropy loss. In some cases, this loss can be expressed as follows.

$$\mathcal{L}_{full} = \mathcal{L}_3(\hat{y}, y) + \gamma\mathcal{L}_{pre} \qquad (3)$$

Here, $\mathcal{L}_3(\cdot,\cdot)$ is the loss between the estimation keyword classification label and a ground truth keyword classification label, and $\gamma>0$ is a hyper-parameter for weighting the combined denoising and SPP loss ($\mathcal{L}_{pre}$) with respect to the cross-entropy loss.

Joint training of the denoising model 502 and the keyword detection model 504 during the second training step can involve updating parameters of the denoising model 502 and/or the keyword detection model 504 until an acceptable accuracy level is reached. For example, when the loss calculated by the loss function is larger than desired, the parameters of the denoising model 502 and/or the keyword detection model 504 can be adjusted. Once adjusted, training can continue by providing the same or additional training data to the adjusted models 502, 504, and additional outputs from the models 502, 504 can be compared to the ground truths so that additional losses can be determined using the loss function. Eventually, the keyword spotting system that includes the denoising model 502 and the keyword detection model 504 produces more accurate outputs that more closely match the ground truths, and the measured loss becomes less. At some point, the measured loss can drop below a specified threshold, and the joint training of the denoising model 502 and the keyword detection model 504 can be completed.

Although FIGS. 5A and 5B illustrate one example of a training process 500, various changes may be made to FIGS. 5A and 5B. For example, while shown as a series of steps, various steps in FIGS. 5A and 5B could overlap, occur in parallel, occur in a different order, or occur any number of times (including zero times).

Figure 6A:
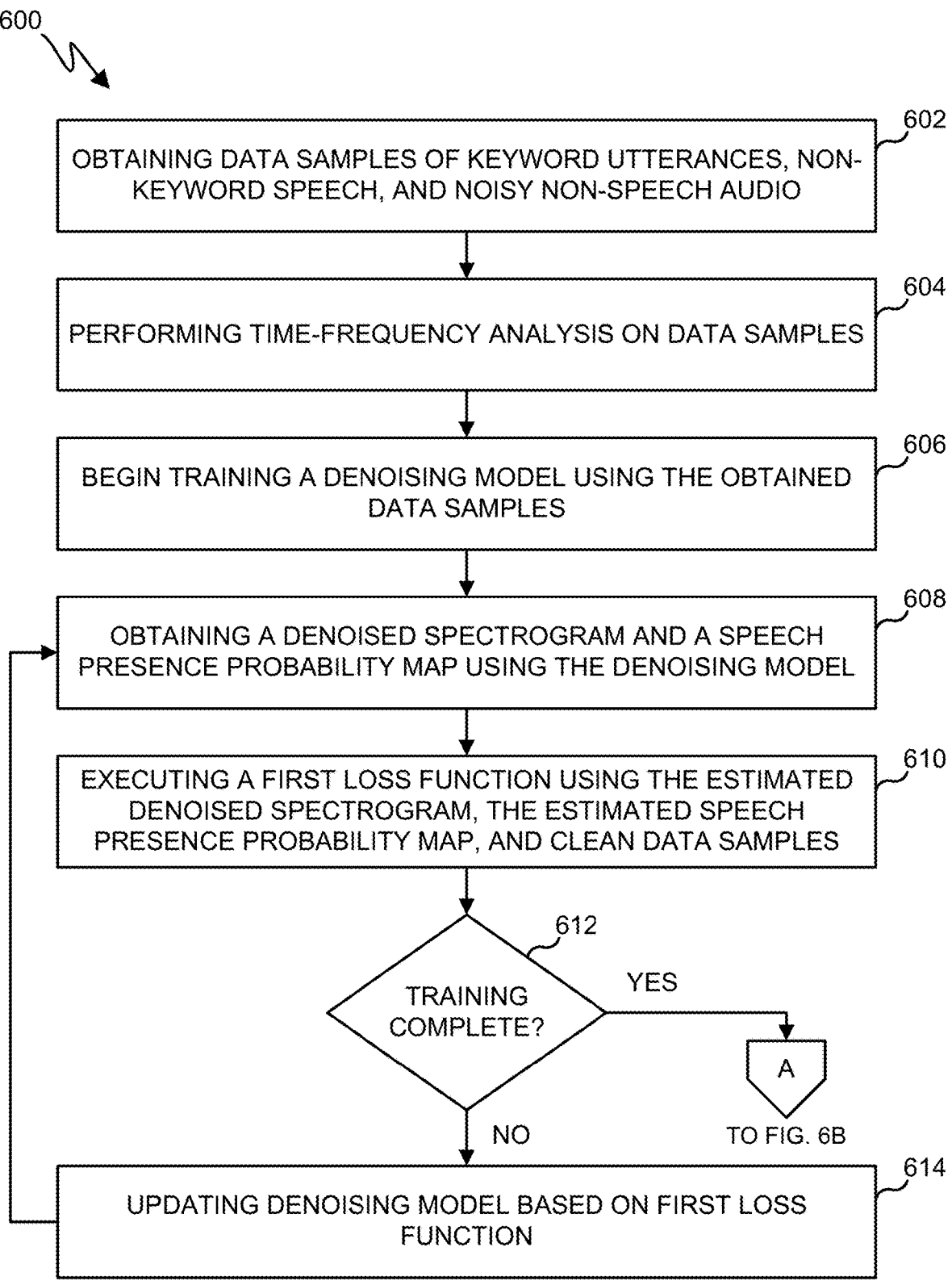

FIGS. 6A and 6B illustrate an example method 600 for training a keyword spotting system in accordance with this disclosure. For ease of explanation, the method 600 shown in FIGS. 6A and 6B is described as being performed using the server 106 in the network configuration 100 of FIG. 1. As a particular example, the method 600 can be executed on the server 106 in the network configuration 100 of FIG. 1, and one or more trained machine learning models (such as a trained noise management model 202 and a trained keyword detection model 204) can be deployed to a client electronic device 101 for use as at least part of a keyword spotting system. However, the method 600 may be used with any other suitable device(s), such as the electronic device 101, and in any other suitable system(s).

As shown in FIGS. 6A and 6B, at block 602, noisy and clean audio data samples (such as noisy and clean audio data pairs) are obtained for supervised learning or other training purposes to train a denoising model. In some cases, the data samples can include keyword speech, non-keyword speech, and non-speech signals. The data samples can be obtained in any suitable manner, such as by recording real-world audio using a target device, using some room acoustic simulation software to synthesize data, or using other techniques. At block 604, a time-frequency analysis is performed on the data samples to transform the data samples from a time domain into spectral-temporal representations. This may include, for example, the processor 120 of the server 106 performing a time-frequency operation on the data samples, such as STFT, MelSpectrogram, Mel Frequency Cepstral Coefficient (MFCC), and/or other time-frequency operations.

At block 606, a first training step begins in which a denoising model (such as model 202, 302, 502) is trained. As described in this disclosure, the denoising model is trained using the noisy-clean data pairs to more accurately predict denoising masks used to create enhanced magnitude spectrograms and SPP maps that represent a likelihood that speech is contained in the audio signals. At block 608, a denoised spectrogram and a speech presence probability map are obtained using the denoising model. At step 610, a first loss function is executed using the estimated denoised spectrogram, the estimated SPP map, and the clean data samples. This can include, for example, the processor 120 executing the first loss function shown in Equation (2) above. This first training step thus may include the processor 120 training the denoising model using a training dataset including pairs of noisy speech audio samples and clean speech audio samples, where predicted denoising masks are applied to corresponding noisy speech audio samples in the first training operation to provide predicted enhanced spectrograms. Here, a first loss function is executed based on differences between the predicted enhanced spectrograms and ground truth spectrograms corresponding to the clean speech audio samples and based on differences between predicted SPP maps and clean SPP maps corresponding to the clean speech audio samples.

At decision block 612, it is determined whether training of the denoising model is complete. This can include, for example, the processor 120 determining whether the loss is below a threshold. If not, the method 600 moves to block 614. At block 614, parameters of the denoising model are updated based on the first loss function, and the method moves back to block 608. Training of the denoising model during the first training step can involve performing multiple training steps and updating parameters of the denoising model until an acceptable accuracy level is reached. For example, when the loss calculated by the loss function is larger than desired, the parameters of the denoising model can be adjusted, and training can continue once the denoising model is adjusted by providing the same or additional training data to the adjusted denoising model. Additional outputs from the denoising model can be compared to the ground truths so that additional losses can be determined using the loss function. Eventually, the denoising model produces more accurate outputs that more closely match the ground truths, and the measured loss becomes less. At some point, the measured loss can drop below a specified threshold, and the initial training of the denoising model can be completed. Once it is determined at decision block 612 that the first training step is complete, the method moves to block 616.

At block 616, a second training step begins in which the denoising model and a keyword detection model (such as model 204, 304, 504) are jointly trained. At block 618, a denoised spectrogram and a speech presence probability map are obtained using the denoising model. At block 620, an estimated keyword detection result (such as a class label) is obtained using the keyword detection model, where the keyword detection model obtains the results using the denoised spectrogram and the speech presence probability map as inputs. At step 622, a second loss function is executed using the estimated keyword detection result, the estimated denoised spectrogram, the estimated SPP map, and ground truth keyword data samples. This can include, for example, the processor 120 executing the second loss function shown in Equation (3) above. Thus, after training the denoising model, the denoising model and the keyword classification model are jointly trained using a second loss function that reduces or minimizes a difference between predicted keywords and ground truth keywords.

At decision block 624, it is determined whether the joint training of the denoising model and the keyword detection model is complete. This can include, for example, the processor 120 determining whether the loss from the second loss function is below a threshold. If not, the method 600 moves to block 626. At block 626, parameters of the denoising model and/or the keyword detection model are updated based on the second loss function, and the method moves back to block 618. Joint training of the denoising model and the keyword detection model during the second training step can involve updating parameters of the denoising model and/or the keyword detection model until an acceptable accuracy level is reached. For example, when the loss calculated by the second loss function is larger than desired, the parameters of the denoising model and/or the keyword detection model can be adjusted. Once adjusted, training can continue by providing the same or additional training data to the adjusted models, and additional outputs from the models can be compared to the ground truths so that additional losses can be determined using the loss function. Eventually, the keyword spotting system that includes the denoising model and the keyword detection model produces more accurate outputs that more closely match the ground truths, and the measured loss becomes less. At some point, the measured loss can drop below a specified threshold, and the joint training of the denoising model and the keyword detection model can be completed. Once it is determined at decision block 624 that the second training step is complete, the method ends at block 628.

Although FIGS. 6A and 6B illustrate one example of a method 600 for training a keyword spotting system, various changes may be made to FIGS. 6A and 6B. For example, while shown as a series of steps, various steps in FIGS. 6A and 6B could overlap, occur in parallel, occur in a different order, or occur any number of times (including zero times).

FIG. 7 illustrates an example keyword spotting method 700 in accordance with this disclosure. For ease of explanation, the method 700 shown in FIG. 7 is described as being performed using the electronic device 101 in the network configuration 100 of FIG. 1. However, the method 700 could be performed using any other suitable device(s), such as the server 106, and in any other suitable system(s).

At block 702, a noisy audio signal is received. This may include, for example, the processor 120 of the electronic device 101 receiving noisy audio waveforms recorded by an audio input device. At block 704, time-frequency analysis is performed on the noisy audio signal. This may include, for example, the processor 120 of the electronic device 101 performing a time-frequency operation on the raw recorded audio data in a time domain audio waveform, such as performing STFT, MelSpectrogram, MFCC, and/or other time-frequency operations, to generate noisy time-frequency representations of the audio data, such as is described with respect to FIG. 3. In various embodiments, the particular time-frequency analysis performed at block 704 matches the time-frequency analysis used during training of the noise management model.

At block 706, the noisy time-frequency representation is provided to the noise management model trained to predict a denoising mask and a signal presence probability (SPP) map indicating a likelihood of a presence of speech. The SPP map can indicate a likelihood of the presence of speech in one or more time-frequency bins. At block 708, an enhanced spectrogram is determined using the denoising mask and the noisy time-frequency representation. This may include, for example, the processor 120 applying the denoising mask on a magnitude of the audio input and transforming the enhanced spectrogram to a spectral domain. In some embodiments, the SPP map is provided by the noise management model in the same spectral domain as the enhanced spectrogram.

At block 710, the enhanced spectrogram and the SPP map are provided as inputs to a keyword classification model trained to determine a likelihood of a keyword being present in the audio input. For example, the keyword detection model can output a keyword classification label and can include a probability that a particular keyword is found in the audio data. At decision block 712, it is determined whether a keyword was detected or not. This may include, for example, the processor 120 comparing the probability provided by the keyword detection model to a threshold. For instance, if the output of the keyword detection model indicates that the audio includes or likely includes an utterance of a keyword, the method moves to block 714. If the output of the keyword detection model indicates that the audio does not include or likely does not include an utterance of a keyword, the method ends at block 716.

At block 714, responsive to determining that a keyword is in the audio input, the audio input is transmitted to a downstream application associated with the keyword. For example, the audio signal can be used by one or more other machine learning processes, such as one or more voice assistant processes and/or ASR/NLU processes. For instance, the audio signal can be used to determine whether the utterance includes a device command, such as a command like calling a contact, playing music, changing a setting in an IoT device, etc.

Although FIG. 7 illustrates one example of a keyword spotting method 700, various changes may be made to FIG. 7. For example, while shown as a series of steps, various steps in FIG. 7 could overlap, occur in parallel, occur in a different order, or occur any number of times (including zero times).

It will be understood that the speech enhancement and keyword detection systems and methods of this disclosure can be used in various embodiments to perform denoising and keyword detection on various types of devices like edge devices and mobile platforms, such as refrigerators, cell phones, vacuum cleaners, smart watches, AR/VR glasses, earbuds, smart TVs, etc. The speech enhancement and keyword detection systems and methods of this disclosure can also be used in various embodiments as pre-processing units for voice control, wake word detection, automatic speech recognition, audio anomaly detection, acoustic scene classification, assistive listening, or other functions to improve human hearing experiences in noisy environments. Thus, the speech enhancement and keyword detection systems and methods of this disclosure can be beneficial for various intelligent applications.

It should be noted that the functions shown in FIGS. 2 through 7 or described above can be implemented in an electronic device 101, 102, 104, server 106, or other device (s) in any suitable manner. For example, in some embodiments, at least some of the functions shown in FIGS. 2 through 7 or described above can be implemented or supported using one or more software applications or other software instructions that are executed by the processor 120 of the electronic device 101, 102, 104, server 106, or other device(s). In other embodiments, at least some of the functions shown in FIGS. 2 through 7 or described above can be implemented or supported using dedicated hardware components. In general, the functions shown in FIGS. 2 through 7 or described above can be performed using any suitable hardware or any suitable combination of hardware and software/firmware instructions. Also, the functions shown in FIGS. 2 through 7 or described above can be performed by a single device or by multiple devices. For instance, the server 106 might be used to train the machine learning models, and the server 106 could deploy the trained machine learning models to one or more other devices (such as the electronic device 101) for use.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
receiving an audio input;
generating a noisy time-frequency representation based on the audio input;
dividing the noisy time-frequency representation into a real spectrogram and an imaginary spectrogram;
providing the real spectrogram and the imaginary spectrogram to a noise management model trained to predict both a denoising mask using the real spectrogram and a signal presence probability (SPP) map indicating a likelihood of a presence of speech using the imaginary spectrogram;
determining an enhanced spectrogram using the denoising mask and the noisy time-frequency representation;
providing the enhanced spectrogram and the SPP map as inputs to a keyword classification model trained to determine a likelihood of a keyword being present in the audio input; and
responsive to determining that the keyword is in the audio input, transmitting the audio input to a downstream application associated with the keyword.

2. The method of claim 1, wherein the SPP map indicates the likelihood of the presence of speech in one or more time-frequency bins.

3. The method of claim 1, wherein generating the noisy time-frequency representation includes performing a time-frequency analysis on the audio input in a time domain audio waveform.

4. The method of claim 1, wherein determining the enhanced spectrogram includes applying the denoising mask on a magnitude of the audio input and transforming the enhanced spectrogram to a spectral domain.

5. The method of claim 4, wherein the SPP map is provided by the noise management model in a same spectral domain as the enhanced spectrogram.

6. The method of claim 1, wherein:
the noise management model is trained using a training dataset comprising pairs of noisy speech audio samples and clean speech audio samples;
in a training operation, predicted denoising masks are applied to corresponding noisy speech audio samples to provide predicted enhanced spectrograms; and
in the training operation, a first loss function is executed based on (i) differences between the predicted enhanced spectrograms and ground truth spectrograms corresponding to the clean speech audio samples and (ii) differences between predicted SPP maps and clean SPP maps corresponding to the clean speech audio samples.

7. The method of claim 6, wherein, after training the noise management model, the noise management model and the keyword classification model are jointly trained using a second loss function that minimizes differences between predicted keywords and ground truth keywords.

8. An electronic device comprising:
at least one processing device configured to:
receive an audio input;
generate a noisy time-frequency representation based on the audio input;
divide the noisy time-frequency representation into a real spectrogram and an imaginary spectrogram;
provide the real spectrogram and the imaginary spectrogram to a noise management model trained to predict both a denoising mask using the real spectrogram and a signal presence probability (SPP) map indicating a likelihood of a presence of speech using the imaginary spectrogram;
determine an enhanced spectrogram using the denoising mask and the noisy time-frequency representation;
provide the enhanced spectrogram and the SPP map as inputs to a keyword classification model trained to determine a likelihood of a keyword being present in the audio input; and
responsive to a determination that the keyword is in the audio input, transmit the audio input to a downstream application associated with the keyword.

9. The electronic device of claim 8, wherein the SPP map indicates the likelihood of the presence of speech in one or more time-frequency bins.

10. The electronic device of claim 8, wherein, to generate the noisy time-frequency representation, the at least one processing device is configured to perform a time-frequency analysis on the audio input in a time domain audio waveform.

11. The electronic device of claim 8, wherein, to determine the enhanced spectrogram, the at least one processing device is configured to apply the denoising mask on a magnitude of the audio input and transform the enhanced spectrogram to a spectral domain.

12. The electronic device of claim 11, wherein the noise management model is configured to provide the SPP map in a same spectral domain as the enhanced spectrogram.

13. The electronic device of claim 8, wherein:
the noise management model is trained using a training dataset comprising pairs of noisy speech audio samples and clean speech audio samples;
in a training operation, predicted denoising masks are applied to corresponding noisy speech audio samples to provide predicted enhanced spectrograms; and
in the training operation, a first loss function is executed based on (i) differences between the predicted enhanced spectrograms and ground truth spectrograms corresponding to the clean speech audio samples and (ii) differences between predicted SPP maps and clean SPP maps corresponding to the clean speech audio samples.

14. The electronic device of claim 13, wherein, after training the noise management model, the noise management model and the keyword classification model are jointly trained using a second loss function that minimizes differences between predicted keywords and ground truth keywords.

15. A non-transitory machine-readable medium containing instructions that when executed cause at least one processor of an electronic device to:
receive an audio input;
generate a noisy time-frequency representation based on the audio input;
divide the noisy time-frequency representation into a real spectrogram and an imaginary spectrogram;

provide the real spectrogram and the imaginary spectrogram to a noise management model trained to predict both a denoising mask using the real spectrogram and a signal presence probability (SPP) map indicating a likelihood of a presence of speech using the imaginary spectrogram;

determine an enhanced spectrogram using the denoising mask and the noisy time-frequency representation;

provide the enhanced spectrogram and the SPP map as inputs to a keyword classification model trained to determine a likelihood of a keyword being present in the audio input; and responsive to a determination that the keyword is in the audio input, transmit the audio input to a downstream application associated with the keyword.

16. The non-transitory machine-readable medium of claim 15, wherein the SPP map indicates the likelihood of the presence of speech in one or more time-frequency bins.

17. The non-transitory machine-readable medium of claim 15, wherein the instructions that when executed cause the at least one processor to generate the noisy time-frequency representation comprise:

instructions that when executed cause the at least one processor to perform a time-frequency analysis on the audio input in a time domain audio waveform.

18. The non-transitory machine-readable medium of claim 15, wherein the instructions that when executed cause the at least one processor to determine the enhanced spectrogram comprise:

instructions that when executed cause the at least one processor to apply the denoising mask on a magnitude of the audio input and transform the enhanced spectrogram to a spectral domain.

19. The non-transitory machine-readable medium of claim 18, wherein the noise management model is configured to provide the SPP map in a same spectral domain as the enhanced spectrogram.

20. The non-transitory machine-readable medium of claim 15, wherein:

the noise management model is trained using a training dataset comprising pairs of noisy speech audio samples and clean speech audio samples;

in a training operation, predicted denoising masks are applied to corresponding noisy speech audio samples to provide predicted enhanced spectrograms;

in the training operation, a first loss function is executed based on (i) differences between the predicted enhanced spectrograms and ground truth spectrograms corresponding to the clean speech audio samples and (ii) differences between predicted SPP maps and clean SPP maps corresponding to the clean speech audio samples; and after training the noise management model, the noise management model and the keyword classification model are jointly trained using a second loss function that minimizes differences between predicted keywords and ground truth keywords.

* * * * *